(12) United States Patent
Takase et al.

(10) Patent No.: US 11,054,640 B2
(45) Date of Patent: Jul. 6, 2021

(54) DISPLAYING SYSTEM AND MOVING OBJECT

(71) Applicant: PANASONIC INTELLECTUAL PROPERTY MANAGEMENT CO., LTD., Osaka (JP)

(72) Inventors: Yuji Takase, Osaka (JP); Kouzou Yuuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 346 days.

(21) Appl. No.: 16/284,573

(22) Filed: Feb. 25, 2019

(65) Prior Publication Data
US 2019/0265470 A1 Aug. 29, 2019

(30) Foreign Application Priority Data

Feb. 28, 2018 (JP) .............................. JP2018-035938

(51) Int. Cl.
*G02B 27/01* (2006.01)
*G02B 5/00* (2006.01)
*G02B 5/30* (2006.01)

(52) U.S. Cl.
CPC ......... *G02B 27/0101* (2013.01); *G02B 5/003* (2013.01); *G02B 5/3083* (2013.01); *G02B 2027/0118* (2013.01)

(58) Field of Classification Search
CPC .. G02B 27/0101; G02B 5/003; G02B 5/3083; G02B 2027/0118
See application file for complete search history.

(56) References Cited

U.S. PATENT DOCUMENTS

| | | |
|---|---|---|
| 2016/0062113 A1 | 3/2016 | El-Ghoroury et al. |
| 2016/0178901 A1 | 6/2016 | Ishikawa |
| 2017/0163911 A1 | 6/2017 | El-Ghoroury et al. |
| 2018/0373028 A1 | 12/2018 | Yamaguchi et al. |

FOREIGN PATENT DOCUMENTS

| | | |
|---|---|---|
| JP | 2015-031924 | 2/2015 |
| JP | 2017-102347 | 6/2017 |
| JP | 2017-527859 | 9/2017 |
| WO | 2017-141491 | 8/2017 |

OTHER PUBLICATIONS

Yokoe, "Head-up display device", WO 2017141491, machine translation (Year: 2017).*

* cited by examiner

*Primary Examiner* — Wen Huang
(74) *Attorney, Agent, or Firm* — Greenblum & Bernstein, P.L.C.

(57) ABSTRACT

The displaying system includes a display unit, a projection unit, and a light-transmissive member. The display unit is configured to display an image. The projection unit is configured to reflect rays of light constituting the image toward a reflective member to project the image onto the reflective member to form a virtual image in a target space. The light-transmissive member has a plate shape. The light-transmissive member is located between the reflective member and the projection unit. The light-transmissive member intersects with an optical axis of light traveling from the projection unit toward the reflective member without forming right angles. The light-transmissive member has in-plane retardation and thickness direction retardation larger than the in-plane retardation.

20 Claims, 6 Drawing Sheets

DISPLAYING SYSTEM AND MOVING OBJECT

CROSS-REFERENCE TO RELATED APPLICATION

The present application is based upon and claims the benefit of priority of Japanese Patent Application No. 2018-035938, filed on Feb. 28, 2018.

TECHNICAL FIELD

The present disclosure generally relates to displaying systems (display systems) and moving objects (movable objects) and particularly to a displaying system (display system) for formation of a virtual image in a target space and a moving object (movable object) including the displaying system.

BACKGROUND ART

JP 2015-31924 A (JP 6131766 B) discloses a vehicular head-up display device which allows a window shield or a combiner to reflect display light passing through a dust cover to present display information as a virtual image which can be seen from a driver sheet of a vehicular. According to JP 2015-31924 A, the dust cover is formed by rolling, thereby having light-transmissive properties reflecting such rolling. Luminance of the virtual image is controlled by controlling an angle between a rolling direction of a resin sheet for forming the dust cover and a longitudinal axis of the virtual image from a display reflected by a reflective mirror.

In JP 2015-31924 A, the luminance of the virtual image changes with a period of 90 degrees relative to the angle between the rolling direction and the longitudinal axis. Therefore, the luminance of the virtual image tends to easily and drastically vary depending on a shape error of the resin sheet (light-transmissive member) in a shaping process and displacement (especially, angular displacement) between the display (display unit) and the resin sheet in an assembling process.

An object would be to propose a displaying system and a moving object capable of reducing variation of luminance of a virtual image depending on a shape error of a light-transmissive member in a shaping process and displacement between a display unit and the light-transmissive member in an assembling process.

SUMMARY

A displaying system according to one aspect of the present disclosure includes a display unit, a projection unit and a light-transmissive member. The display unit is configured to display an image. The projection unit is configured to reflect rays of light constituting the image toward a reflective member to project the image onto the reflective member to form a virtual image in a target space. The light-transmissive member has a plate shape. The light-transmissive member is located between the reflective member and the projection unit. The light-transmissive member intersects with an optical axis of the light traveling from the projection unit toward the reflective member without forming right angles. The light-transmissive member has in-plane retardation and thickness direction retardation larger than the in-plane retardation.

A moving object according to one aspect of the present disclosure includes the displaying system and a moving object body. The moving object body includes the reflective member. The displaying system is mounted on the moving object body.

DETAILED DESCRIPTION

1. Embodiments 1.1 Overview

Figure 1:
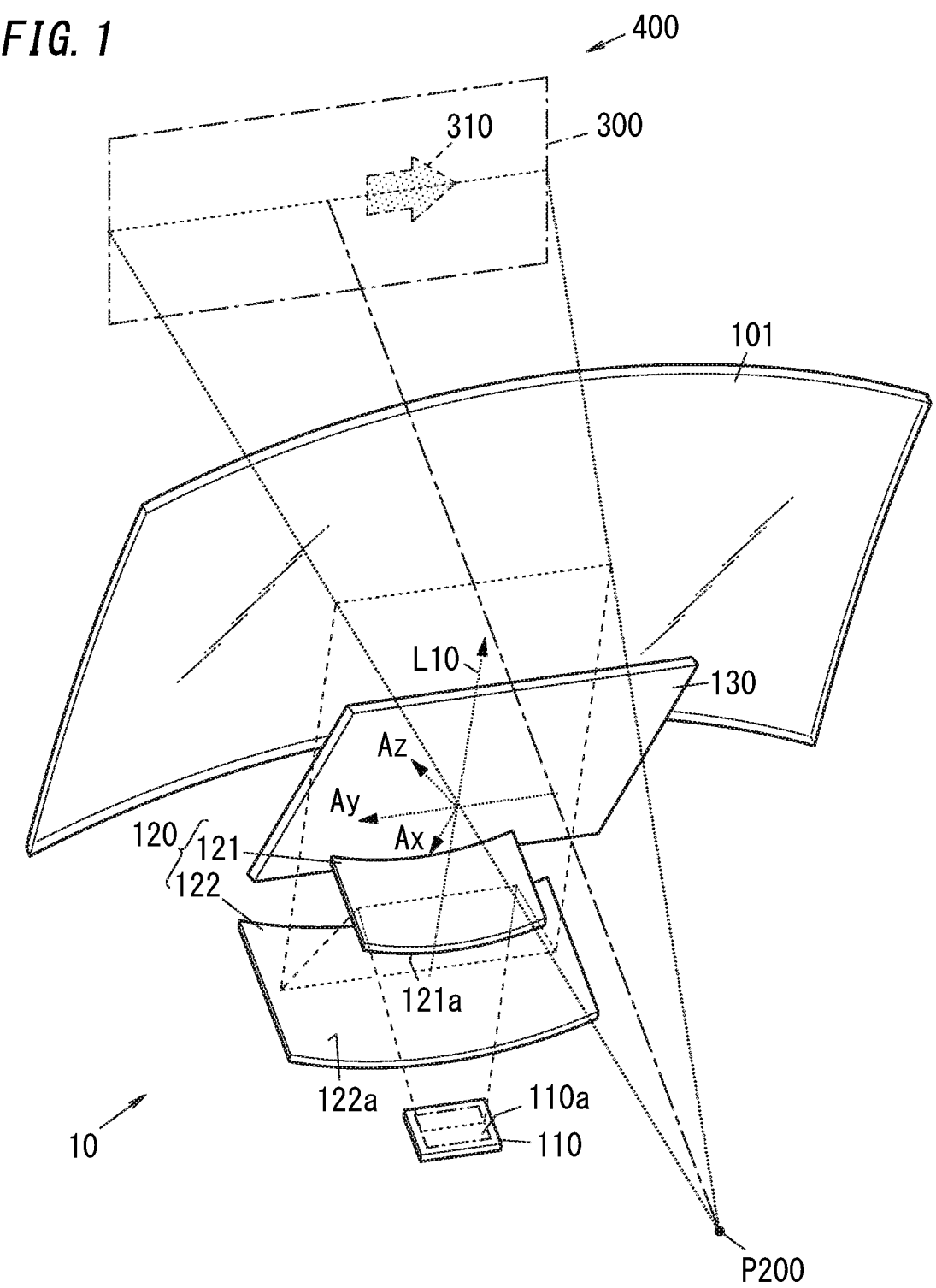
FIG. 1 is a conceptual view of a displaying system of one embodiment.

FIG. 1 shows a displaying system 10 of one embodiment. The displaying system 10 includes a display unit 110, a projection unit 120, and a light-transmissive member 130. The display unit 110 is configured to display an image. The projection unit 120 is configured to reflect rays of light constituting the image toward a reflective member (window shield) 101 to project the image onto the reflective member 101 to form a virtual image 310 in a target space 400. The light-transmissive member 130 has a plate shape. The light-transmissive member 130 is located between the reflective member 101 and the projection unit 120. The light-transmissive member 130 intersects with an optical axis L10 of the light traveling from the projection unit 120 toward the reflective member 101 without forming right angles. The light-transmissive member 130 has in-plane retardation and thickness direction retardation larger than the in-plane retardation.

In the displaying system 10, the light-transmissive member 130 has the thickness direction retardation larger than the in-plane retardation. Therefore, light passing through the light-transmissive member 130 tends to be influenced by the thickness direction retardation rather than the in-plane retardation of the light-transmissive member 130. In this regard, when influence by the in-plane retardation of the light-transmissive member 130 is dominant, luminance of the virtual image 310 varies with a period of about 90 degrees with respect to rotation around a thickness axis Az (see FIG. 1) of the light-transmissive member 130. When influence by the thickness direction retardation of the light-transmissive member 130 is dominant, luminance of the virtual image 310 varies with a period of about 180 degrees with respect to rotation around the thickness axis Az (see FIG. 1) of the light-transmissive member 130. Accordingly, in contrast to a case where the in-plane retardation of the light-transmissive member 130 is equal to or larger than the thickness direction retardation, it is possible to reduce variation of luminance of the virtual image 310 due to a shape error of the light-transmissive member 130 in a shaping process. Examples of the shaping error may include deviation of actual direction from desired direction with regard to a slow axis Ax and a fast axis Ay (see FIG. 1) of the light-transmissive member 130. The shaping error may occur in formation of the light-transmissive member 130 by punching a resin sheet made by rolling to have in-plane retardation. Additionally, it is possible to reduce variation of luminance of the virtual image 310 due to displacement between the display unit 110 and the light-transmissive member 130 in an assembling process (rotation of the light-transmissive member 130 around the thickness axis Az. Consequently, the displaying system 10 is capable of reducing variation of luminance of the virtual image 310 which would otherwise be caused by a shape error of the light-transmissive member 130 in a shaping process and displacement between the display unit 110 and the light-transmissive member 130 in an assembling process.

1.2 Configurations

Figure 2:
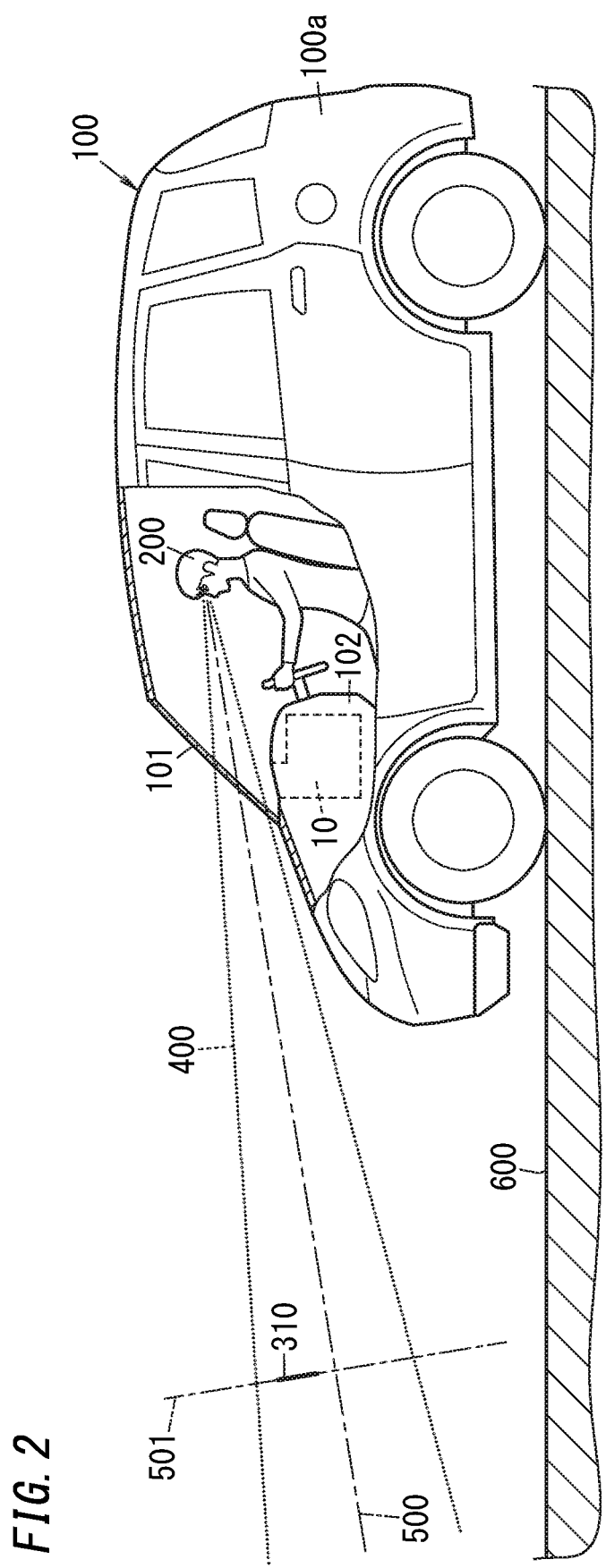
FIG. 2 is a conceptual view of a moving object (automobile) including the displaying system.

FIG. 2 shows an automobile 100 exemplifying a moving object. The automobile 100 includes an automotive body 100a exemplifying a moving object body, and the displaying system 10 installed in the automotive body 100a. The displaying system 10 is used in the automobile 100 as a head-up display (HUD). In particular, the displaying system 10 is an augmented reality (AR) HUD. Therefore, the displaying system 10 displays the virtual image 310 overlaid on a front scene seen by the user 200 by use of augmented reality (AR) techniques.

The displaying system 10 is installed in an interior of the automobile 100 to project an image onto a wind shield 101 of the automotive body (moving object body) 100a of the automobile 100 from below. In an example shown in FIG. 2, the displaying system 10 is placed inside a dashboard 102 below the wind shield 101. When an image is projected from the displaying system 10 onto the wind shield 101, the image reflected from the wind shield 101 serving as a reflective member may be visually perceived by a user 200 (driver).

Figure 3:
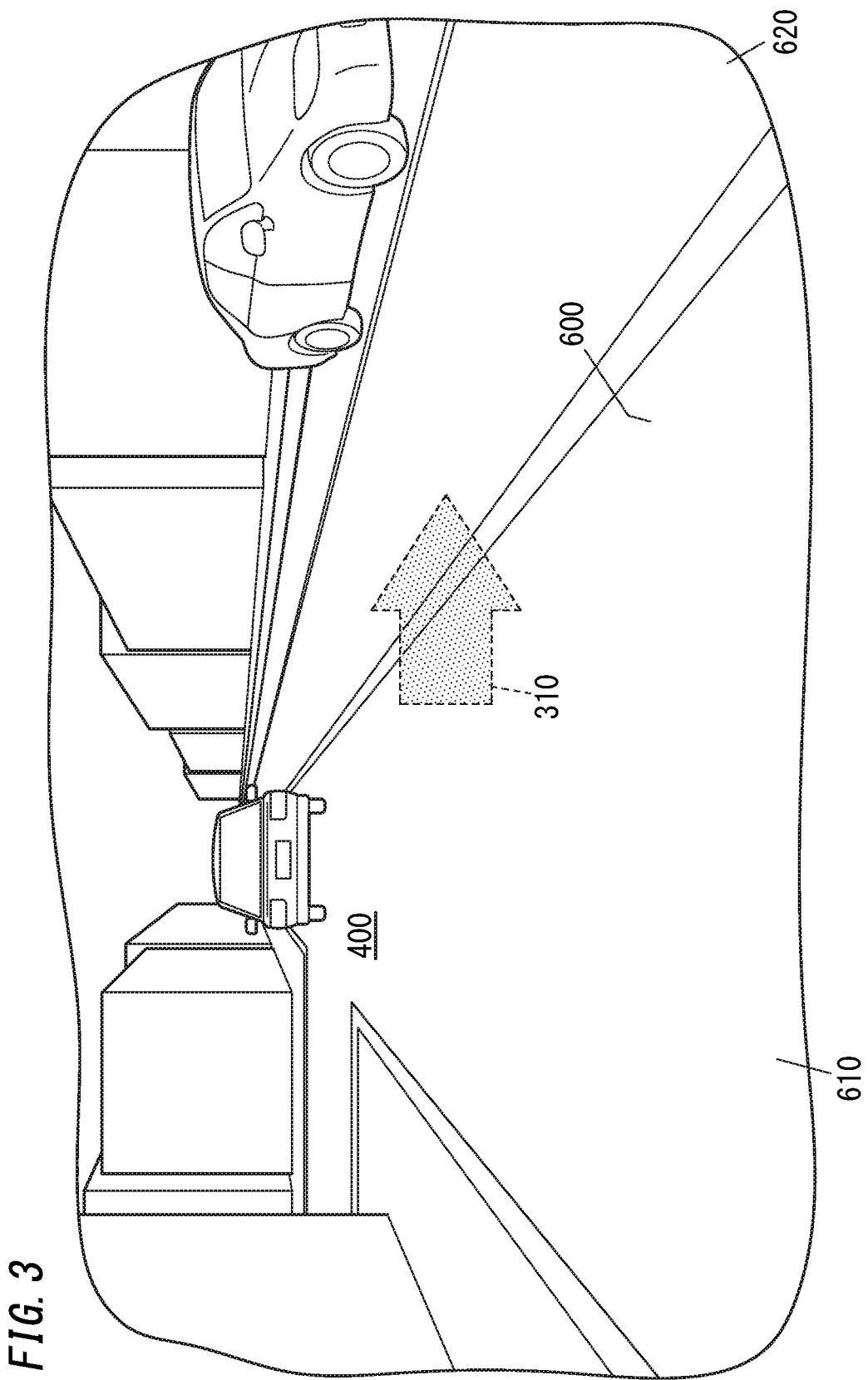
FIG. 3 is a conceptual view of a field of view of a user using the displaying system.

The displaying system 10 allows the user 200 to visually perceive a virtual image 310 formed in a target space 400 positioned in front of (outside) the automobile 100 over the wind shield 101. In this disclosure, a "virtual image" means an image which is formed by diffused rays of light caused when light emitted from the displaying system 10 is diffused by a reflective member such as the wind shield 101 and appears as if a real object. Therefore, as shown in FIG. 3, the user 200 driving the automobile 100 can see the virtual image 310 which is formed by the displaying system 10 and is overlaid on a real space spreading in front of the automobile 100. Accordingly, the displaying system 10 can display the virtual image 310 indicating various driving assist information such as vehicle speed information, navigation information, pedestrian information, forward vehicle information, lane departure information, and vehicle condition information, and can allow the user 200 to visually perceive it. In FIG. 3, the virtual image 310 indicates navigation information exemplified by an arrow for lane change. Accordingly, when the user 200 trains his or her eyes on a space in front of the wind shield 101, the user 200 can visually obtain the driving assist information by slight movement of a line of his or her sight.

In the displaying system 10, the virtual image 310 created in the target space 400 is present within an imaginary plane 501 across an optical axis 500 of the displaying system 10. In the present embodiment, the optical axis 500 extends along a road surface 600 in front of the automobile 100 in the target space 400 in front of the automobile 100. And, the imaginary plane 501 where the virtual image 310 is created is almost perpendicular to the road surface 600. For example, when the road surface 600 is a horizontal surface, the virtual image 310 may be seen as if it extends along a vertical surface. Note that, the imaginary plane 501 where the virtual image 310 is formed may be inclined relative to the optical axis 500. An angle of the imaginary plane 501 to the optical axis 500 may not be limited particularly.

Figure 4:
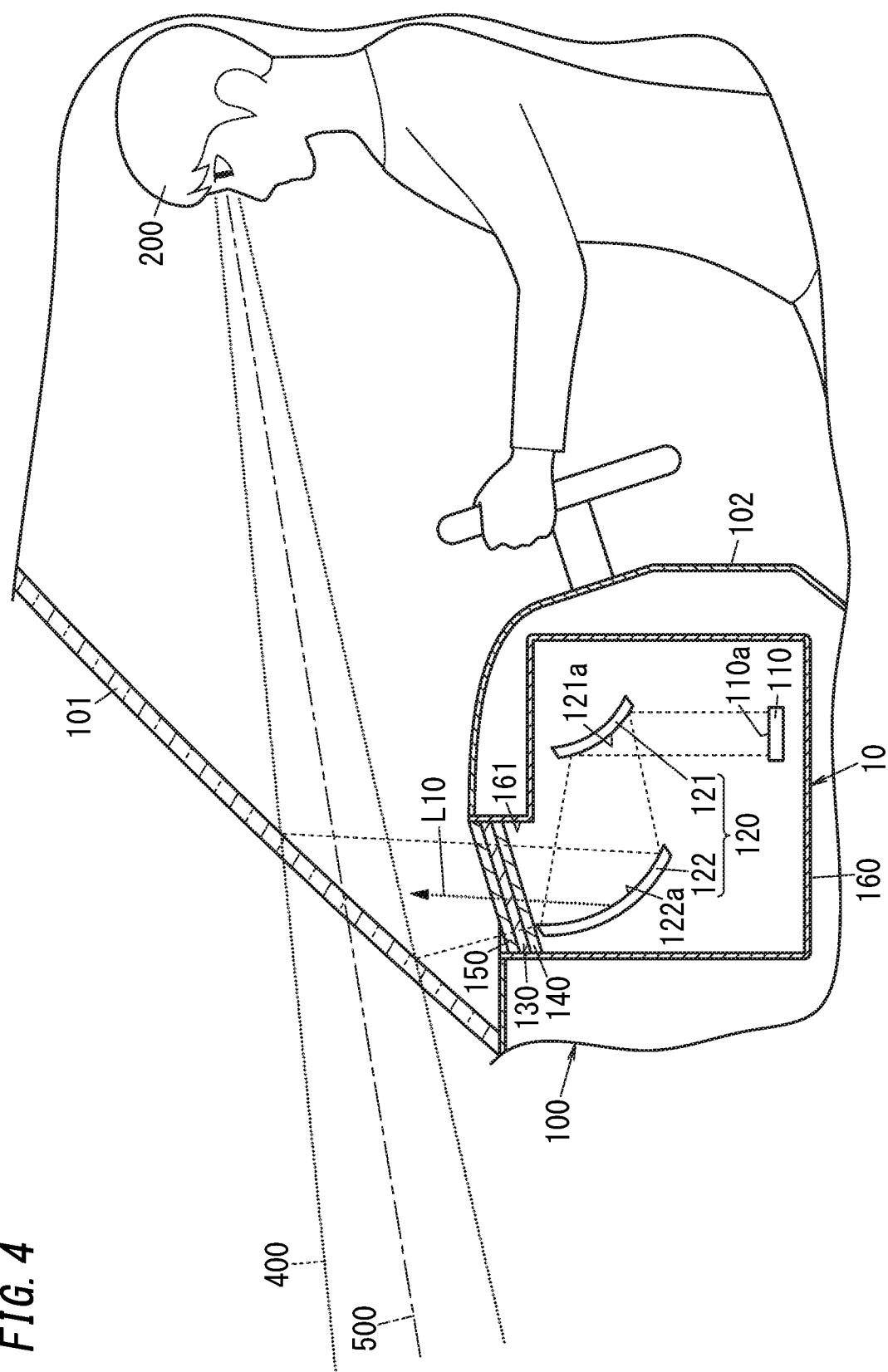
FIG. 4 is a conceptual view for illustration of the displaying system.

Hereinafter, the displaying system 10 is described in detail. As shown in FIG. 4, the displaying system 10 includes the display unit 110, the projection unit 120, and the light-transmissive member 130. In addition, the displaying system 10 includes a polarization member 140 and an infrared absorption member 150.

The display unit 110 is configured to display an image. Especially, the display unit 110 is used to display an image to be shown in the target space 400 as the virtual image 310. As shown in FIG. 1, the display unit 110 includes a display surface 110a for displaying an image. In the present embodiment, the display surface 110a is a rectangular region in a surface of the display unit 110. In a point of view of downsizing the displaying system 10, it may be preferable that the display surface 110a occupies almost an entire surface of the display unit 110. In the present embodiment, the display unit 110 includes a liquid crystal display. The display unit 110 includes a liquid crystal panel, and an area light source (surface light source) used as a backlight for the liquid crystal panel. The liquid crystal panel transmits selectively one or more components of light from the area light source located in back of the liquid crystal panel to form an image on the display surface 110a of the display unit 110. In the present embodiment, the liquid crystal panel transmits components in a predetermined direction of light from the area light source to form an image on the display surface 110a. In the present embodiment, components in the predetermined direction may correspond to those in a length direction of the liquid crystal panel in a rectangular shape. In this case, the liquid crystal panel transmits linearly-polarized light vibrating in the length direction of the liquid crystal panel. Such a liquid crystal panel generally includes a liquid crystal layer, a pair of oriented film located opposite sides of the liquid crystal layer, a pair of transparent electrodes for applying voltages across the liquid crystal layer, color filters defining colors of individual pixels, a polarizer, and the like. Such configuration of the liquid crystal panel is well-known and therefore detail description thereof is deemed unnecessary.

The projection unit 120 is used to form in the target space 400 the virtual image 310 corresponding to the image (the image displayed on the display surface 110a of the display unit 110). The projection unit 120 is configured to reflect rays of light constituting the image by the display unit 110 toward a reflective member (window shield) 101 to project the image onto the reflective member 101 to form the virtual image 310 in the target space 400. As shown in FIG. 1, the projection unit 120 includes a first optical member 121 and a second optical member 122. In other words, the projection unit 120 is an optical system constituted by the first optical member 121 and the second optical member 122.

The first optical member 121 is a mirror reflecting light from the display unit 110 toward the second optical member 122. As shown in FIG. 1, the first optical member 121 includes a first reflective surface 121a for reflecting rays of light constituting an image. The first reflective surface 121a has a larger size than the display surface 110a. The first optical member 121 is placed relative to the display unit 110 so that the first reflective surface 121a reflects an entire image on the display surface 110a of the display unit 110. In the present embodiment, the first reflective surface 121a includes a convex surface. Thus, rays of light emitted from the image displayed on the display surface 110a of the display unit 110 strike the second optical member 122 with angles of divergence increased. In other words, rays of light constituting the image are diffused by the first reflective surface 121a and then strike the second reflective surface 122a. Note that, the first reflective surface 121a may be a spherical surface or an aspherical surface (free-form surface). Especially, the first reflective surface 121a may be an aspherical surface designed to correct distortion of an image. Note that, in the present embodiment, the first reflective surface 121a is a partial or entire region of the surface of the first optical member 121. In summary, the first reflective surface 121a may be a region (effective region) which belongs to the surface of the first optical member 121 and actually reflects rays of light constituting an image. The first optical member 121 may preferably have such a size that the virtual image 310 is shown in a complete form even when a position of a point of view of the user 200 moves within a space where the position of the point of view is assumed to be present (e.g., an eye box).

The second optical member 122 is a mirror reflecting light from the first optical member 121 toward the wind shield 101. The second optical member 122 projects an image formed (displayed) on the display surface 110a of the display unit 110 onto the wind shield 101, thereby forming the virtual image 310 in the target space 400. As shown in FIG. 1, the second optical member 122 includes a second reflective surface 122a for reflecting rays of light reflected from the first reflective surface 121a to form the virtual image 310 in the target space 400. The second reflective surface 122a has a larger size than the first reflective surface 121a. The second optical member 122 is placed relative to the first optical member 121 to reflect a complete image on the display surface 110a of the display unit 110. In the present embodiment, the second reflective surface 122a includes a concave surface. Note that, the second reflective surface 122a may be a spherical surface or an aspherical surface (free-form surface). Especially, the second reflective surface 122a may be an aspherical surface designed to correct distortion of an image. Note that, in the present embodiment, the second reflective surface 122a is a partial or entire region of the surface of the second optical member 122. In summary, the second reflective surface 122a may be a region (effective region) which belongs to the surface of the second optical member 122 and actually reflects rays of light constituting an image. The second optical member 122 may preferably have such a size that the virtual image 310 is shown in a complete form even when a position of a point of view of the user 200 moves within a space where the position of the point of view is assumed to be present (e.g., an eye box).

The light-transmissive member 130 has a plate shape. The light-transmissive member 130 has characteristics of causing birefringence of light. In detail, as shown in FIG. 1, the light-transmissive member 130 includes the slow axis Ax and the fast axis Ay which are axes intersect at right angles within a surface of the light-transmissive member 130. Further, the light-transmissive member 130 includes the thickness axis Az perpendicular to the slow axis Ax and the fast axis Ay. Further, the light-transmissive member 130 has the in-plane retardation and the thickness direction retardation larger than the in-plane retardation. As described above, the light-transmissive member 130 has the thickness direction retardation larger than the in-plane retardation. Therefore, light passing through the light-transmissive member 130 is considered to be easily influenced by the thickness direction retardation rather than the in-plane retardation of the light-transmissive member 130. In this regard, when influence of the in-plane retardation of the light-transmissive member 130 is dominant, variation of luminance of the virtual image 310 has a period of about 90°. In contrast, when influence of the thickness direction retardation of the light-transmissive member 130 is dominant, variation of luminance of the virtual image 310 has a period of about 180°. Therefore, in contrast to a case where the light-transmissive member 130 has the in-plane retardation equal to or larger than the thickness direction retardation, it is possible to reduce variation of luminance of the virtual image 310 caused by displacement of the light-transmissive member 130 (rotation around the thickness axis Az of the light-transmissive member 130).

In this regard, as to the light-transmissive member 130, a refractive index in directions along the slow axis Ax is denoted by "Nx", a refractive index in directions along the fast axis Ay is denoted by "Ny", a refractive index in directions along the thickness axis Az is denoted by "Nz", and a thickness of the light-transmissive member 130 is denoted by "d". In this case, the in-plane retardation is given by a relation of (Nx−Ny)×d. The thickness direction retardation is given by a relation of {(Nx+Ny)/2−Nz}×d. In the present embodiment, the refractive indices Nx, Ny, and Nz of the light-transmissive member 130 are selected such that the in-plane retardation and the thickness direction retardation further satisfy the following conditions (1) to (3). In detail, the condition (1) defines that the in-plane retardation is smaller than a quarter of a wavelength of rays of light constituting the image by the display unit 110. The condition (2) defines that the thickness direction retardation is larger than a quarter of a wavelength of rays of light constituting the image by the display unit 110. The condition (3) defines that the thickness direction retardation is equal to or larger than three times the in-plane retardation. By satisfying the individual conditions (1) to (3), influence of the thickness direction retardation can be made larger than influence of the in-plane retardation. Accordingly, further reduction of variation of luminance of the virtual image 310 relative to displacement of the light-transmissive member 130 can be expected.

Examples of the light-transmissive member 130 described above may include a resin sheet formed of a light-transmissive resin (e.g., polycarbonate) by rolling. In one example, Nx is 1.59028, Ny is 1.59021, Nz is 1.58951, and d is 425 [μm]. Further, a wavelength of rays of light constituting the image by the display unit 110 falls within a wavelength band centered on 550 [nm].

The light-transmissive member 130 is located between the reflective member 101 and the projection unit 120. Further, the light-transmissive member 130 is located to intersect with the optical axis L10 of light traveling from the projection unit 120 toward the reflective member 101 without forming right angles. In other, words, the optical axis L10 is not parallel to the thickness axis Az of the light-transmissive member 130. Stated differently, an incident angle of light traveling from the projection unit 120 toward the reflective member 101 on the light-transmissive member 130 is not zero.

The polarization member 140 has a plate shape. As shown in FIG. 4, the polarization member 140 is located between the projection unit 120 and the light-transmissive member 130. In particular, the polarization member 140 is located on or over a surface of the light-transmissive member 130 directed to the second optical member 122. The polarization member 140 has properties of absorbing part of external light traveling toward the projection unit 120 by passing through the light-transmissive member 130. Thus, the display unit 110 can be protected from heat. The polarization member 140 is a polarizer for converting elliptically-polarized light into linearly-polarized light, for example. The polarization member 140 polarizes light (light from the projection unit 120) to maximize amount of light striking the reflective member 101. In other words, the polarization member 140 has a transmission axis which is set to transmit a component of light which has maximum amount of light passing through the light-transmissive member 130 and strikes the reflective member 101. Consequently, it is possible to protect the display unit 110 from heat and yet reduce decrease in luminance of the virtual image 310.

The infrared absorption member 150 has a plate shape. As shown in FIG. 4, the infrared absorption member 150 is located between the reflective member 101 and the light-transmissive member 130. In particular, the infrared absorption member 150 is located on an opposite side of the light-transmissive member 130 from the polarization member 140. The infrared absorption member 150 has characteristics of transmitting visible light but absorbing infrared light. Thus, the display unit 110 can be protected from heat. The infrared absorption member 150 is constituted by one or more layers absorbing infrared light. Note that, it is preferable that the infrared absorption member 150 has no influence on polarization of light.

Further, the displaying system 10 includes a housing 160. As shown in FIG. 4, the housing 160 accommodates the display unit 110, the projection unit 120, the light-transmissive member 130, the infrared absorption member 150, and the polarization member 140. The housing 160 includes an opening 161 allowing passage of light reflected from the projection unit 120 toward the reflective member 101. The light-transmissive member 130, the polarization member 140, and the infrared absorption member 150 are located to cover the opening 161. In particular, the light-transmissive member 130, the polarization member 140, and the infrared absorption member 150 are stacked. In the present embodiment, the housing 160 located inside the dashboard 102.

1.3 Advantageous Effects

Optical characteristics of the light-transmissive member 130 are described below with reference to FIG. 5 to FIG. 8.

Figure 5:
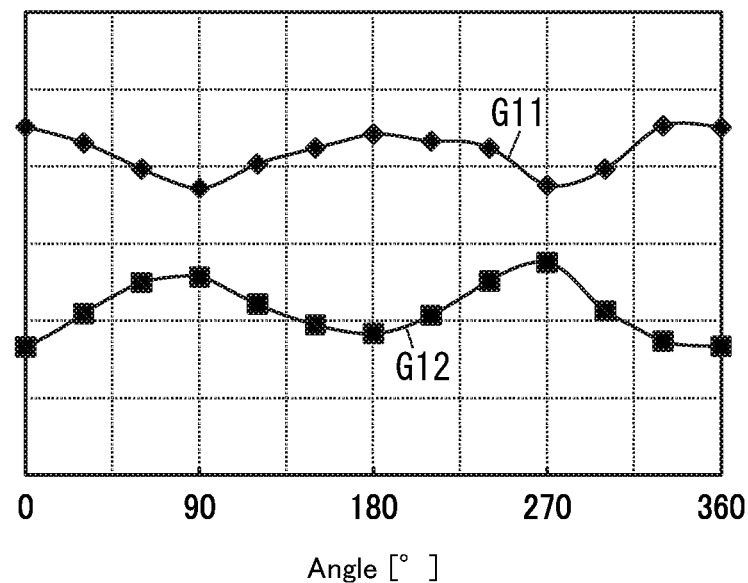
FIG. 5 is a graph illustration for change in luminance of a virtual image formed by light which passes through a light-transmissive member and is reflected by a reflective member, of the displaying system.

FIG. 5 is a graph of illustration for variation of luminance of the virtual image 310 produced by light which passes through the light-transmissive member 130 and is reflected by the reflective member 101. In the graph of FIG. 5, the horizontal axis denotes an angle [°] between the slow axis Ax and the optical axis L10 within a plane perpendicular to the thickness axis Az of the light-transmissive member 130. Therefore, when the angle is zero degree, the optical axis L10 is identical to the slow axis Ax. When the angle is 90°, the optical axis L10 is identical to the fast axis Ay. In the graph of FIG. 5, the vertical axis denotes luminance of luminance of the virtual image 310 produced by light which passes through the light-transmissive member 130 and is reflected by the reflective member 101. In FIG. 5, G11 represents luminance of the total of components of light reflected by the reflective member 101 and G12 represents luminance of a p component (a polarization component in a direction perpendicular to the horizontal direction) of light reflected by the reflective member 101. As obviously understood from FIG. 5, in each of G11 and G12, luminance of light varies with a period of 180 degrees. It is confirmed from the graph of FIG. 5 that the influence of the thickness direction retardation becomes larger than the influence of the in-plane retardation when the light-transmissive member 130 has the thickness direction retardation larger than the in-plane retardation. Consequently, in contrast to the case where the light-transmissive member 130 has the in-plane retardation equal to or larger than the thickness direction retardation, it is possible to reduce variation of luminance of the virtual image 310 caused by displacement of the light-transmissive member 130 (rotation around the thickness axis Az of the light-transmissive member 130).

Figure 6:
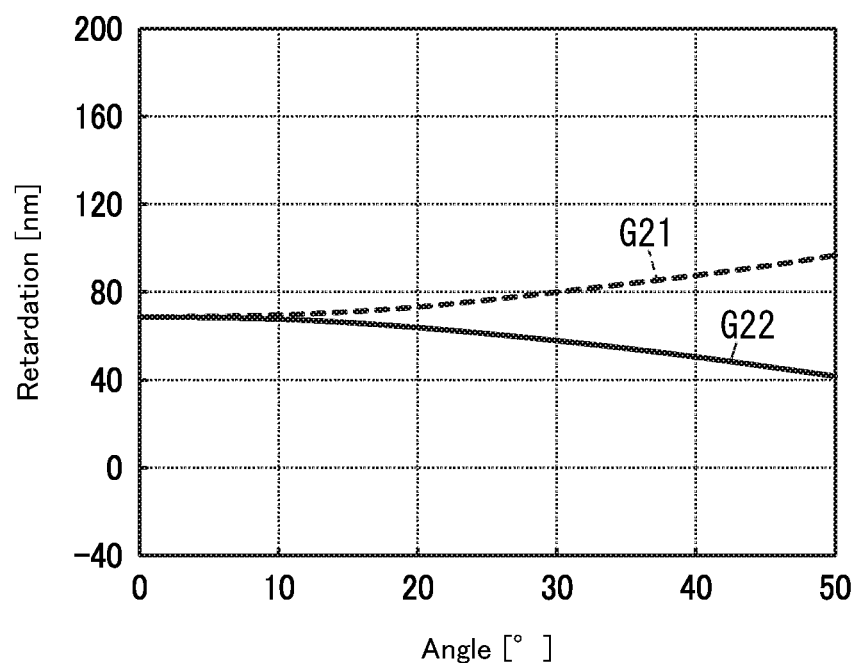
FIG. 6 is a graph illustration for angle dependency of retardation of the light-transmissive member of the displaying system.
Figure 7:
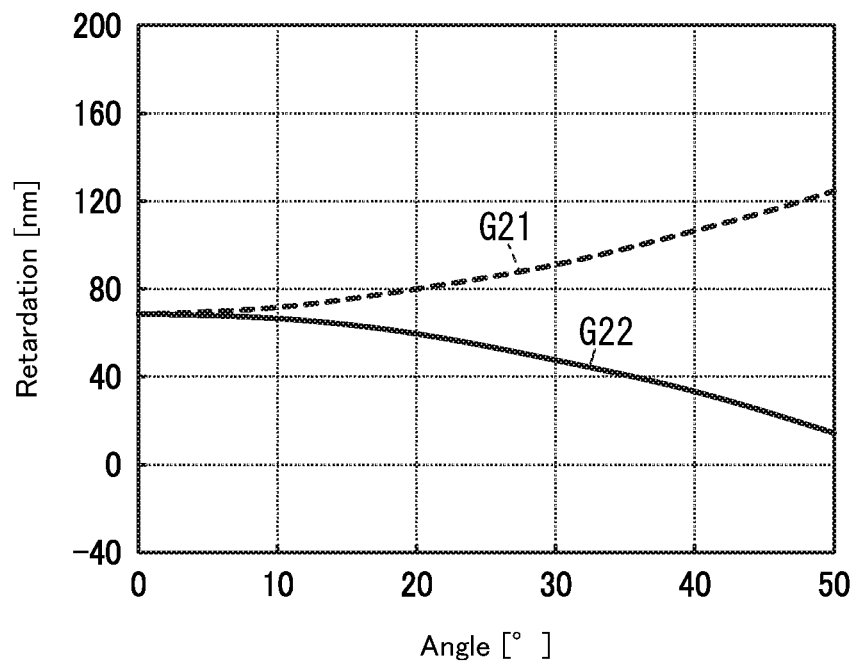
FIG. 7 is another graph illustration for angle dependency of retardation of the light-transmissive member of the displaying system.
Figure 8:
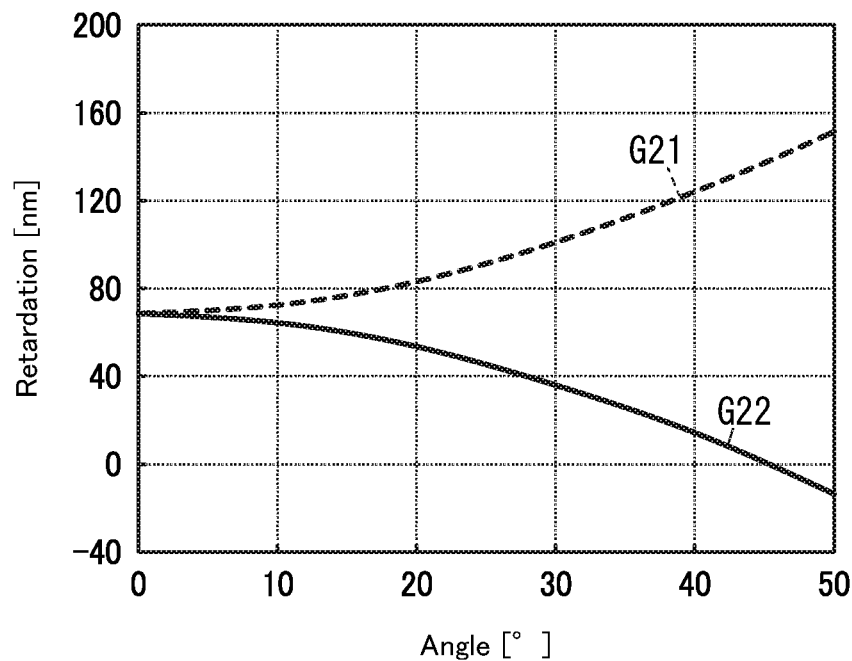
FIG. 8 is another graph illustration for angle dependency of retardation of the light-transmissive member of the displaying system.

FIG. 6 to FIG. 8 show graphs of illustration for angle dependencies of retardation of light-transmissive members. In each of FIG. 6 to FIG. 8, the vertical axis denotes retardation [nm] caused by the light-transmissive member 130. In each of FIG. 6 to FIG. 8, the horizontal axis denotes an angle [°] corresponding to an incident angle of light traveling from the projection unit 120 toward the light-transmissive member 130. In this regard, G21 represents a case where an incident angle of light changes in an incident plane defined by the fast axis Ay and the thickness axis Az of the light-transmissive member 130. In other words, as to G21, the incident angle means an angle around the slow axis Ax. In this case, the optical axis L10 of light is identical to the fast axis Ay within a plane perpendicular to the thickness axis Az of the light-transmissive member 130. In this regard, G22 represents a case where an incident angle of light changes in an incident plane defined by the slow axis Ax and the thickness axis Az of the light-transmissive member 130. In other words, as to G22, the incident angle means an angle around the fast axis Ay. In this case, the optical axis L10 of light is identical to the slow axis Ax within a plane perpendicular to the thickness axis Az of the light-transmissive member 130. Note that, in each of FIG. 6 to FIG. 8, the in-plane retardation is 70 [nm]. In FIG. 6, the thickness direction retardation is 1.5 times larger than the in-plane retardation. In FIG. 7, the thickness direction retardation is 3 times larger than the in-plane retardation. In FIG. 8, the thickness direction retardation is 4.5 times larger than the in-plane retardation. As obviously understood from G21 shown in FIG. 6 to FIG. 8, the degree of increase in the retardation relative to increase in the incident angle around the slow axis Ax increases as the thickness direction retardation becomes larger than the in-plane retardation. As obviously understood from G22 shown in FIG. 6 to FIG. 8, the degree of decrease in the retardation relative to increase in the incident angle around the fast axis Ay increases as the thickness direction retardation becomes larger than the in-plane retardation. Especially, G22 shown in FIG. 6 to FIG. 8 reveals that the retardation of the light-transmissive member 130 can be made equal to or smaller than a half of the in-plane retardation when the thickness direction retardation is equal to or larger than 3 times the in-plane retardation. Consequently, it is possible to expand a selectable range of the retardation of the light-transmissive member 130.

2. Variations

Embodiments of the present disclosure are not limited to the above embodiment. The above embodiment may be modified in various ways in accordance with design or the like as it can achieve the object of the present disclosure. Hereinafter, variations of the above embodiment are listed.

For example, regarding the display unit 110, the liquid crystal panel may transmit components of light in not the length direction thereof but a width direction thereof, or an oblique direction of 15°, 22°, 30°, 45°, 60°, or the like thereof. Further, in the display unit 110, the display surface 110a may not be necessarily required to be rectangular.

For example, regarding the projection unit 120, the first optical member 121 and the second optical member 122 may be modified in their shapes. For example, what is important for the first optical member 121 is the shape of the first reflective surface 121a, and accordingly shapes of other parts may be designed relatively freely. Likewise, what is important for the second optical member 122 is the shape of the second reflective surface 122a, and accordingly shapes of other parts may be designed relatively freely. Additionally, the shapes of the first reflective surface 121a and the second reflective surface 122a may be designed appropriately depending on the display surface 110a.

For example, how to locate the light-transmissive member 130 may not be limited to the above example. In the above embodiment, the light-transmissive member 130 has the slow axis Ax along the optical axis (L10) of light traveling from the projection unit 120 toward the reflective member 101. In this case, as understood from G11 of FIG. 5, luminance of the total of components of light which passes through the light-transmissive member 130 and is reflected by the reflective member 101 has a peak. Therefore, it is possible to display the virtual image 310 suitable for visual recognition by naked eyes. In contrast, the light-transmissive member 130 may have the fast axis Ay along the optical axis (L10) of light traveling from the projection unit 120 toward the reflective member 101. In this case, as understood from G12 of FIG. 5, luminance of the p component of light which passes through the light-transmissive member 130 and is reflected by the reflective member 101 has a peak. In general, many of polarization glasses such as sunglasses transmits p component but blocks s component (polarization component in the horizontal direction). Thus, it is possible to display the virtual image 310 suitable for visual recognition by polarization glasses such as sunglasses. Alternatively, the light-transmissive member 130 has the slow axis Ax and the fast axis Ay intersecting with the optical axis (L10) of light traveling from the projection unit 120 toward the reflective member 101 at an angle of 45°. In this case, it is possible to reduce a difference between luminance of the virtual image 310 seen by naked eyes and luminance of the virtual image 310 seen by use of polarization glasses.

For example, the light-transmissive member 130 may not be constituted by a single resin sheet but may be constituted by a stack of multiple resin sheets. In other words, the light-transmissive member 130 may have a single layer structure or a multilayer structure. Material of the light-transmissive member 130 may not be limited to polycarbonate, but may be acrylic or other conventional light-transmissive resin material.

For example, the light-transmissive member 130 may not be always required to satisfy all of the conditions (1) to (3), provided that at least the thickness direction retardation is larger than the in-plane retardation. In other words, the refractive indices Nx, Ny, and Nz of the light-transmissive member 130 may not be limited particularly as long as the relation of (Nx+Ny)/2−Nz>Nx−Ny is satisfied.

For example, the shape of the light-transmissive member 130 may not be limited to the shape described above. The light-transmissive member 130 may not be limited to having the rectangular plate shape, but may have a circular plate shape, or a polygonal plate shape other than the rectangular plate shape. Additionally, the light-transmissive member 130 may not be flat but curved. In one example, the light-transmissive member 130 may be curved so that a surface directed outside the housing 160 is a curved surface. Thus, it is possible to reduce probability that sunlight passing through the window shield 101 is reflected by the light-transmissive member 130 and comes into the eye box. Further, the light-transmissive member 130 may not be necessarily required to have uniform thickness. Appropriate setting of the shape of the light-transmissive member 130 can give optical functions such as reduction of aberration due to the projection unit 120.

For example, the light-transmissive member 130 may be surface-treated. Such surface treatment can form a film reflecting infrared light, a film reducing reflection of visible light, a film protecting a surface of the light-transmissive member 130, or the like, for example.

For example, the polarization member 140 is optional.

For example, the infrared absorption member 150 may be located between the projection unit 120 and the light-transmissive member 130, between the projection unit 120 and the polarization member 140, or between the light-transmissive member 130 and the polarization member 140. Alternatively, the infrared absorption member 150 is optional. Note that, the light-transmissive member 130 may contain one or more additives having functions of absorbing infrared light at the same level as the infrared absorption member 150. In other words, the light-transmissive member 130 may serve as the infrared absorption member 150.

For example, the displaying system 10 may not be limited to configurations for forming the virtual image 310 in the target space 400 set on a front side in relation to a direction of travel of the automobile 100, but may be configured to form the virtual image 310 on a lateral side, a back side, an upper side, or the like in relation to the direction of travel of the automobile 100. The projection unit 120 may include a relay optical system for forming an intermediate image but such a relay optical system may be optional.

For example, the displaying system 10 may not be limited to a head-up display used in the automobile 100 but may be applied to a moving object other than the automobile 100, such as two wheels, trains, planes, construction machines, and ships. Alternatively, the displaying system 10 may not be limited to being used in a moving object, but may be used in amusement facilities, for example.

3. Aspects

As obviously understood from the above embodiment and variations, the present disclosure contains the following first to sixteenth aspects. Hereinafter, to clearly indicate relationship between the following aspects and the embodiments, reference signs in parentheses are added.

A displaying system (10) of a first aspect includes a display unit (110), a projection unit (120), and a light-transmissive member (130). The display unit (110) is configured to display an image. The projection unit (120) is configured to reflect rays of light constituting the image toward a reflective member (101) to project the image onto the reflective member (101) to form a virtual image. (310) in a target space (400). The light-transmissive member (130) has a plate shape. The light-transmissive member (130) is located between the reflective member (101) and the projection unit (120). The light-transmissive member (130)

intersects with an optical axis (L10) of light traveling from the projection unit (120) toward the reflective member (101) without forming right angles. The light-transmissive member (130) has in-plane retardation and thickness direction retardation larger than the in-plane retardation. Accordingly, the first aspect is capable of reducing variation of luminance of the virtual image (310) depending on a shape error of the light-transmissive member (130) in a shaping process and displacement between the display (110) unit and the light-transmissive member (130) in an assembling process.

A displaying system (10) of a second aspect would be realized in combination with the first aspect. In the second aspect, the in-plane retardation is smaller than a quarter of a wavelength of rays of light constituting the image by the display unit (110). According to the second aspect, influence of the thickness direction retardation can be made larger than influence of the in-plane retardation and further reduction of variation of luminance of the virtual image (310) relative to displacement of the light-transmissive member (130) can be expected.

A displaying system (10) of a third aspect would be realized in combination with the first or second aspect. In the third aspect, the thickness direction retardation is larger than a quarter of a wavelength of rays of light constituting the image by the display unit (110). According to the third aspect, influence of the thickness direction retardation can be made larger than influence of the in-plane retardation and further reduction of variation of luminance of the virtual image (310) relative to displacement of the light-transmissive member (130) can be expected.

A displaying system (10) of a fourth aspect would be realized in combination with any one of the first to third aspects. In the fourth aspect, the thickness direction retardation is equal to or larger than three times the in-plane retardation. According to the fourth aspect, influence of the thickness direction retardation can be made larger than influence of the in-plane retardation and further reduction of variation of luminance of the virtual image (310) relative to displacement of the light-transmissive member (130) can be expected.

A displaying system (10) of a fifth aspect would be realized in combination with any one of the first to fourth aspects. In the fifth aspect, the displaying system (10) further includes a polarization member (140) which is located between the projection unit (120) and the light-transmissive member (130) and absorbs part of external light traveling toward the projection unit (120) by passing through the light-transmissive member (130). Accordingly, the fifth aspect can protect the display unit (110) from heat.

A displaying system (10) of a sixth aspect would be realized in combination with the fifth aspect. In the sixth aspect, the polarization member (140) polarizes light from the projection unit (120) to maximize amount of light striking the reflective member (101). Accordingly, the sixth aspect can protect the display unit (110) from heat and yet reduce decrease in luminance of the virtual image (310).

A displaying system (10) of a seventh aspect would be realized in combination with any one of the first to sixth aspects. In the seventh aspect, the displaying system (10) further includes an infrared absorption member (150) which is located between the reflective member (101) and the projection unit (120) and absorbs infrared light. Accordingly, the seventh aspect can protect the display unit (110) from heat.

A displaying system (10) of an eighth aspect would be realized in combination with the seventh aspect. In the eighth aspect, the infrared absorption member (150) has no influence on polarization of light. Accordingly, the eighth aspect can protect the display unit (110) from heat.

A displaying system (10) of a ninth aspect would be realized in combination with any one of the first to eighth aspects. In the ninth aspect, the displaying system (10) further includes a housing (160) accommodating the display unit (110) and the projection unit (120). The housing (160) includes an opening (161) allowing passage of light reflected from the projection unit (120) toward the reflective member (101). The light-transmissive member (130) covers the opening (161). According to the ninth aspect, the light-transmissive member (130) can serve as a cover for covering the display unit (110) and the projection unit (120).

A displaying system (10) of a tenth aspect would be realized in combination with the ninth aspect. In the tenth aspect, the displaying system (10) further includes a polarization member (140) absorbing part of external light traveling toward the projection unit (120) by passing through the light-transmissive member (130) and an infrared absorption member (150) absorbing infrared light. The polarization member (140) and the infrared absorption member (150) are located to cover the opening (161). According to the tenth aspect, the polarization member (140) and the infrared absorption member (150) can serve as a cover for covering the display unit (110) and the projection unit (120).

A displaying system (10) of an eleventh aspect would be realized in combination with the tenth aspect. In the eleventh aspect, the light-transmissive member (130), the polarization member (140), and the infrared absorption member (150) are stacked. The polarization member (140) is located between the projection unit (120) and the light-transmissive member (130). The infrared absorption member (150) is located on an opposite side of the light-transmissive member (130) from the polarization member (140). According to the eleventh aspect, the light-transmissive member (130), the polarization member (140), and the infrared absorption member (150) can serve as a cover for covering the display unit (110) and the projection unit (120).

A displaying system (10) of a twelfth aspect would be realized in combination with any one of the first to eleventh aspects. In the twelfth aspect, the light-transmissive member (130) is curved. Accordingly, the twelfth aspect can reduce probability that light from the target space (400) is reflected toward a user looking at the virtual image (310).

A displaying system (10) of a thirteenth aspect would be realized in combination with the twelfth aspect. In the thirteenth aspect, the light-transmissive member (130) is curved so that a surface facing the reflective member (101) is a concave surface. Accordingly, the thirteenth aspect can reduce probability that light from the target space (400) is reflected toward a user looking at the virtual image (310).

A displaying system (10) of a fourteenth aspect would be realized in combination with any one of the first to thirteenth aspects. In the fourteenth aspect, the light-transmissive member (130) has a fast axis (Ay) and a slow axis (Ax). The slow axis (Ax) is along the optical axis (L10). Accordingly, the fourteenth aspect can display the virtual image (310) suitable for visual recognition by naked eyes.

A displaying system (10) of a fifteenth aspect would be realized in combination with any one of the first to thirteenth aspects. In the fifteenth aspect, the light-transmissive member (130) has a fast axis (Ay) and a slow axis (Ax). The fast axis (Ay) is along the optical axis (L10). Accordingly, the fifteenth aspect can display the virtual image (310) suitable for visual recognition by polarization glasses such as sunglasses.

A moving object (100) of a sixteenth aspect includes the displaying system (10) according to any one of the first to fifteenth aspects, and a moving object body (100a) including the reflective member (101). The displaying system (10) is mounted on the moving object body (100a). Accordingly, the sixteenth aspect is capable of reducing variation of luminance of the virtual image (310) depending on a shape error of the light-transmissive member (130) in a shaping process and displacement between the display (110) unit and the light-transmissive member (130) in an assembling process.

While various embodiments have been described herein above, it is to be appreciated that various changes in form and detail may be made without departing from the spirit and scope of the present disclosure presently or hereafter claimed.

The entire contents of Japanese Patent Application No. 2018-035938 mentioned above are incorporated by reference.

The invention claimed is:

1. A displaying system comprising;
a display unit configured to display an image;
a projection unit configured to reflect rays of light constituting the image toward a reflective member to project the image onto the reflective member to form a virtual image in a target space; and
a light-transmissive member having a plate shape, the light-transmissive member being located between the reflective member and the projection unit, the light-transmissive member intersecting with an optical axis of light traveling from the projection unit toward the reflective member without forming right angles, and the light-transmissive member having in-plane retardation and thickness direction retardation larger than the in-plane retardation, wherein
the light-transmissive member has a fast axis and a slow axis and one of the slow axis or the fast axis is along the optical axis.

2. The displaying system according to claim 1, wherein the in-plane retardation is smaller than a quarter of a wavelength of rays of light constituting the image by the display unit.

3. The displaying system according to claim 1, wherein the thickness direction retardation is larger than a quarter of a wavelength of rays of light constituting the image by the display unit.

4. The displaying system according to claim 2, wherein the thickness direction retardation is larger than a quarter of a wavelength of rays of light constituting the image by the display unit.

5. The displaying system according to claim 1, wherein the thickness direction retardation is equal to or larger than three times the in-plane retardation.

6. The displaying system according to claim 2, wherein the thickness direction retardation is equal to or larger than three times the in-plane retardation.

7. The displaying system according to claim 3, wherein the thickness direction retardation is equal to or larger than three times the in-plane retardation.

8. The displaying system according to claim 4, wherein the thickness direction retardation is equal to or larger than three times the in-plane retardation.

9. The displaying system according to claim 1, further comprising
a polarization member which is located between the projection unit and the light-transmissive member and absorbs part of external light traveling toward the projection unit by passing through the light-transmissive member.

10. The displaying system according to claim 9, wherein the polarization member polarizes light from the projection unit to maximize amount of light striking the reflective member.

11. The displaying system according to claim 1, further comprising
an infrared absorption member which is located between the reflective member and the projection unit and absorbs infrared light.

12. The displaying system according to claim 11, wherein the infrared absorption member has no influence on polarization of light.

13. The displaying system according to claim 1, further comprising
a housing accommodating the display unit and the projection unit,
wherein:
the housing includes an opening allowing passage of light reflected from the projection unit toward the reflective member; and
the light-transmissive member covers the opening.

14. The displaying system according to claim 13, further comprising:
a polarization member absorbing part of external light traveling toward the projection unit by passing through the light-transmissive member; and
an infrared absorption member absorbing infrared light, wherein the polarization member and the infrared absorption member are located to cover the opening.

15. The displaying system according to claim 14, wherein:
the light-transmissive member, the polarization member, and the infrared absorption member are stacked;
the polarization member is located between the projection unit and the light-transmissive member; and
the infrared absorption member is located on an opposite side of the light-transmissive member from the polarization member.

16. The displaying system according to claim 1, wherein the light-transmissive member is curved.

17. The displaying system according to claim 16, wherein the light-transmissive member is curved so that a surface facing the reflective member is a concave surface.

18. The displaying system according to claim 1, wherein the slow axis is along the optical axis.

19. The displaying system according to claim 1, wherein the fast axis is along the optical axis.

20. A moving object comprising:
the displaying system according to claim 1; and
a moving object body including the reflective member, the displaying system being mounted on the moving object body.

* * * * *